United States Patent
Kairali et al.

(10) Patent No.: US 12,206,559 B2
(45) Date of Patent: Jan. 21, 2025

(54) ADAPTING MICROSERVICES TO MULTI-PLATFORM DEPLOYMENTS

(71) Applicant: INTERNATIONAL BUSINESS MACHINES CORPORATION, Armonk, NY (US)

(72) Inventors: Sudheesh S. Kairali, Kozhikode (IN); Sreekanth Ramakrishna Iyer, Bangalore (IN); Vijay Kalangumvathakkal, Pathanamthitta (IN); Ashish Kumar Thakur, Asansol (IN); Jagdish Kumar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 17/308,533

(22) Filed: May 5, 2021

(65) Prior Publication Data

US 2022/0360504 A1 Nov. 10, 2022

(51) Int. Cl.
| | |
|---|---|
| *H04L 41/082* | (2022.01) |
| *G06F 8/65* | (2018.01) |
| *G06F 9/445* | (2018.01) |
| *H04L 12/14* | (2006.01) |
| *H04L 41/22* | (2022.01) |
| *H04L 41/5051* | (2022.01) |

(52) U.S. Cl.
CPC ............ *H04L 41/5051* (2013.01); *G06F 8/65* (2013.01); *G06F 9/44526* (2013.01); *H04L 12/1414* (2013.01); *H04L 12/1428* (2013.01); *H04L 41/082* (2013.01); *H04L 41/22* (2013.01)

(58) Field of Classification Search
CPC ... H04L 41/22; H04L 41/082; H04L 41/5051; G06F 9/44526; G06F 8/60; G06F 8/65; G06F 8/70; G06F 8/72; G06F 8/32
See application file for complete search history.

(56) References Cited

U.S. PATENT DOCUMENTS

| | | | |
|---|---|---|---|
| 9,838,376 B1 | 12/2017 | Lander et al. | |
| 11,442,725 B1 * | 9/2022 | Chawda | G06F 8/60 |

(Continued)

OTHER PUBLICATIONS

Nabor C. Mendonça et.al, "Developing Self-Adaptive Microservice Systems: Challenges and Directions", https://www.researchgate.net/publication/337550638_Developing_SelfAdaptive_Microservice_Systems_Challenges_and_Directions, Nov. 2019, 8 pages.

(Continued)

*Primary Examiner* — Tom Y Chang
(74) *Attorney, Agent, or Firm* — Monchai Chuaychoo; Andrew D. Wright; Calderon Safran & Wright P.C.

(57) ABSTRACT

A method includes: receiving, by a computing device, a microservice code from a user device; identifying, by the computing device, a service used by the microservice code; identifying, by the computing device, the service in a target cloud platform; generating, by the computing device, a modified microservice code by adding a predefined code template to the microservice code, the predefined code template being associated with the service in the target cloud platform; receiving, by the computing device, user input defining a value of a parameter in the predefined code template in the modified microservice code; and generating, by the computing device, a new deployment file for the target cloud platform based on the modified microservice code.

20 Claims, 6 Drawing Sheets

(56) References Cited

U.S. PATENT DOCUMENTS

| | | | | |
|---|---|---|---|---|
| 2008/0270515 | A1* | 10/2008 | Chen | G06F 9/4856 |
| | | | | 709/201 |
| 2012/0137285 | A1* | 5/2012 | Glikson | G06F 9/5077 |
| | | | | 718/1 |
| 2014/0130036 | A1* | 5/2014 | Gurikar | G06F 8/62 |
| | | | | 717/176 |
| 2017/0168778 | A1* | 6/2017 | Brandys | G06F 9/455 |
| 2019/0102280 | A1* | 4/2019 | Caldato | H04L 67/10 |
| 2019/0303564 | A1* | 10/2019 | Kelly | G06F 21/577 |
| 2020/0133738 | A1 | 4/2020 | Junior | |
| 2021/0124576 | A1 | 4/2021 | Gungabeesoon et al. | |
| 2021/0132935 | A1* | 5/2021 | Dinh | G06F 9/4411 |
| 2021/0263735 | A1 | 8/2021 | Harishankar et al. | |
| 2021/0271463 | A1* | 9/2021 | Pal | G06F 8/75 |
| 2022/0050897 | A1* | 2/2022 | Gaddam | G06N 3/006 |

OTHER PUBLICATIONS

Gustavo Sousa et.al, "Automated Setup of Multi-cloud Environments for Microservices Applications", https://ieeexplore.ieee.org/document/7820288, Jul. 2016, 8 pages.

Adalberto R. Sampaio Jr et.al, "Improving microservice-based applications with runtime placement adaptation", https://link.springer.com/article/10.1186/s13174-019-0104-0, Feb. 26, 2019, 30 pages.

Juliana Carvalho et.al, "PacificClouds: A Flexible MicroServices based Architecture for Interoperability in Multi-Cloud Environments", https://www.researchgate.net/publication/324044178_PacificClouds_A_Flexible_MicroServices_based_Architecture_for_Interoperability_in_Multi-Cloud_Environments, Jan. 2018, 9 pages.

Anonymous, "Method for using discovered code re-use in microservice architecture to diseminate updates", IP.com No. IPCOM000253041D, ip.com, Feb. 28, 2018, 3 pages.

Jamshidi et al., "Pattern-based Multi-Cloud Architecture Migration", Aug. 2016, 26 pages.

"IBM Cloud Migration Factory", https://www.ibm.com/downloads/cas/6JKLMRLY, Jul. 9, 2018, 17 pages.

Palesandro et al., "Mantus: Putting Aspects to Work for Flexible Multi-Cloud Deployment", https://zenodo.org/record/835729/files/Mantus-Putting-Aspects-to-Work-for-Flexible-Multi-Cloud-Deployment.pdf, accessed May 4, 2021, 8 pages.

Mell et al., "The NIST Definition of Cloud Computing", NIST, Special Publication 800-145, Sep. 2011, 7 pages.

Harris, "Microservices vs. monolithic architecture", https://www.atlassian.com/microservices/microservices-architecture/microservices-vs-monolith, ATLASSIAN, Page Accessed Jun. 4, 2024, 15 pages.

* cited by examiner

| Motivation For the pattern | Pattern | CDRO replaced code for cloud platform 1 | CDRO replaced code for cloud platform 2 | CDRO replaced code for cloud platform 3 |
|---|---|---|---|---|
| Pod1 | connectDatabase(config, providerName, requirements) | var Cloudant = require('@cloudant/cloudant'); const cloudantUrl = "https://" + config.userName + ":" + config.password + "@" + config.hostEndpoint; var cloudant = Cloudant({ url: cloudantUrl }) cloudant.db.create(config.dataBaseName) | var mysql = require('mysql'); var connection = mysql.createConnection({ host: config.hostEndpoint, user: config.userName, password: config.password, database: config.dataBaseName });connection.connect(); | const { CosmosClient } = require("@azure/cosmos"); const endpoint = config.hostEndpoint; // Add your endpoint const key = "[config.accessKey]"; // Add the masterkey of the endpoint const client = new CosmosClient({ endpoint, key }); const databaseDefinition = { id: config.dataBaseName }; client.databases.create(databaseDefinition) |

510 → Motivation/Pattern columns
511 → CDRO replaced code for cloud platform 1
512 → CDRO replaced code for cloud platform 2
513 → CDRO replaced code for cloud platform 3

ADAPTING MICROSERVICES TO MULTI-PLATFORM DEPLOYMENTS

BACKGROUND

Aspects of the present invention relate generally to cloud computing and, more particularly, to adapting microservices to multicloud deployments.

Multicloud architecture (also called multicloud computing) involves the use of resources and/or services from different cloud providers. For example, an enterprise may concurrently use separate cloud providers for infrastructure, platform, and software services. Multicloud computing differs from hybrid cloud in that it refers to multiple cloud services rather than multiple deployment modes (e.g., public, private, legacy). Also, in multicloud computing, synchronization between different cloud providers is not essential to complete a computation process. Multicloud computing provides a mechanism to avoid vendor dependence and to minimize downtime and data loss by employing a combination of resources and/or services from different cloud providers.

SUMMARY

In a first aspect of the invention, there is a computer-implemented method including: receiving, by a computing device, a microservice code from a user device; identifying, by the computing device, a service used by the microservice code; identifying, by the computing device, the service in a target cloud platform; generating, by the computing device, a modified microservice code by adding a predefined code template to the microservice code, the predefined code template being associated with the service in the target cloud platform; receiving, by the computing device, user input defining a value of a parameter in the predefined code template in the modified microservice code; and generating, by the computing device, a new deployment file for the target cloud platform based on the modified microservice code.

In another aspect of the invention, there is a computer program product of an integrated development environment (IDE). The computer program product includes one or more computer readable storage media having program instructions collectively stored on the one or more computer readable storage media. The program instructions are executable to: present a user interface (UI) to a user, wherein the UI is configured to permit a user to write a microservice code; identify a service used by the microservice code; identify the service in a target cloud platform; generate a modified microservice code by adding a predefined code template to the microservice code, the predefined code template being associated with the service in the target cloud platform; receive user input defining a value of a parameter in the predefined code template in the modified microservice code; and generate a new deployment file for the target cloud platform based on the modified microservice code.

In another aspect of the invention, there is system including a processor, a computer readable memory, one or more computer readable storage media, and program instructions collectively stored on the one or more computer readable storage media. The program instructions are executable to: receive a microservice code that is currently deployed on a source cloud platform; identify services used by the microservice code; identify the services in a target cloud platform; generate a modified microservice code by adding predefined code templates to the microservice code, wherein respective ones of the predefined code templates are specific to respective ones of the services in the target cloud platform; receive user input defining values of parameters in the predefined code templates in the modified microservice code; and generate a new deployment file for the target cloud platform based on the modified microservice code.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to cloud computing and, more particularly, to adapting microservices to multicloud deployments. According to aspects of the invention, a system adapts a microservice code that is written specifically for a source cloud platform to be run on a target cloud platform. In embodiments, the system identifies services and resources used by the microservice code, and maps these identified services and resources to services and resources available in the target cloud platform. In embodiments, the system automatically modifies the microservice code using predefined templates based on the mapped services and resources. Embodiments include preparing a microservice deployment configuration and hooking a supporting service configuration to the microservice deployment configuration. In this manner, implementations of the invention can be used to generate a new deployment file that runs the microservice code on the target cloud platform.

The replacement of legacy services with microservices has put forth many new challenges in cloud computing. Microservices architecture is a methodology that breaks up an application into plural different services (e.g., microservices) that each perform a very specific process of the application. Microservices operate by making calls to one another and/or external services/resources and receiving responses to those calls. Different cloud providers often have different supporting services and integrations, and a microservice that is created for a particular cloud platform is written using calls to the supporting services and integrations that are used by the cloud platform. If that microservice is moved to a different cloud platform that has different supporting services and integrations, then that microservice will not run on the different cloud platform because the calls in the microservice do not match the supporting services and integrations used in the different cloud platform. As a result, when an enterprise wishes to move a microservice from a first cloud platform to a second cloud platform, a DevOps (software development and operations) team must manually resolve each configuration and other related issues on the supporting services and integrations.

Implementations of the invention address this problem by automatically adapting a microservice code to run on a target cloud platform. In accordance with aspects of the invention, a system runs a comprehensive code scan on the microservice code to identify supporting services and services available in cloud catalog usage. In embodiments, the target cloud platform is then scanned for a discovery of its services, and the system then maps the services of the microservice code to the services of the target cloud platform. In embodiments, the system automatically hooks the microservice code to the services of the target cloud platform using a template pattern to handle code injection. In embodiments, the system generates a new deployment file with all the discovered dependencies based on the identified configurations and required resources. Embodiments may also involve optimizing the security posture and availability of the microservice prior to deployment. In this manner, implementations of the invention include a system and method that provide for automatic adaptation of microservice code and deployment and operational configurations for multicloud (e.g., heterogeneous) deployments. Implementations of the invention may further provide for preemptive optimization of availability of a microservice in a multicloud deployment. Implementations of the invention may further provide for preemptive optimization of security and compliance posture of a microservice in a multicloud deployment. Implementations of the invention may further provide for integration with an integrated development environment (IDE), which allows developers to select options to fine tune a microservice code to target cloud platforms in an optimized way, and which allows developers to identify beta features and options that are most often selected by other users in similar platforms.

Implementations of the invention provide an improvement in the technical field of cloud computing. In particular, implementations of the invention automatically adapt a microservice code to run on a target cloud platform, thereby reducing the time and effort that would otherwise be spent by a by DevOps team when manually resolving configurations and other related issues on supporting services and integrations. Implementations of the invention also transform an article to a different state or thing. In particular, implementations of the invention modify a source microservice code using code injections that replace portions of the source microservice code with predefined templates of other code. Implementations of the invention also generate a new deployment file for running the modified microservice code on the target cloud platform.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
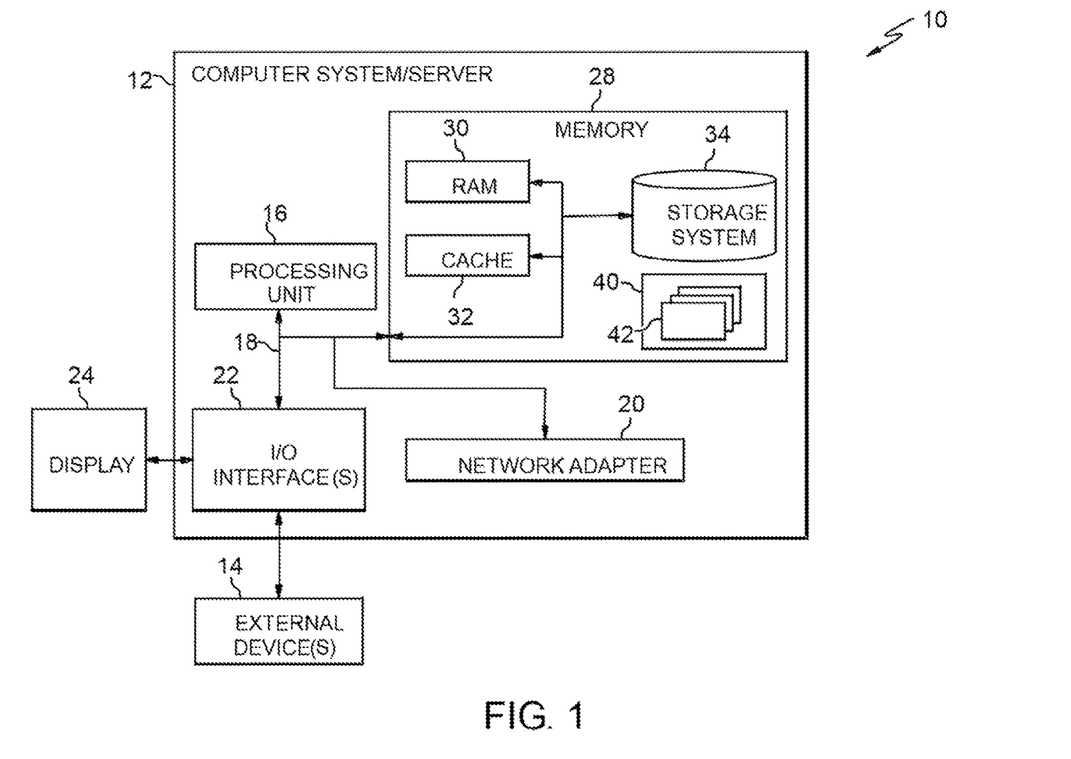
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
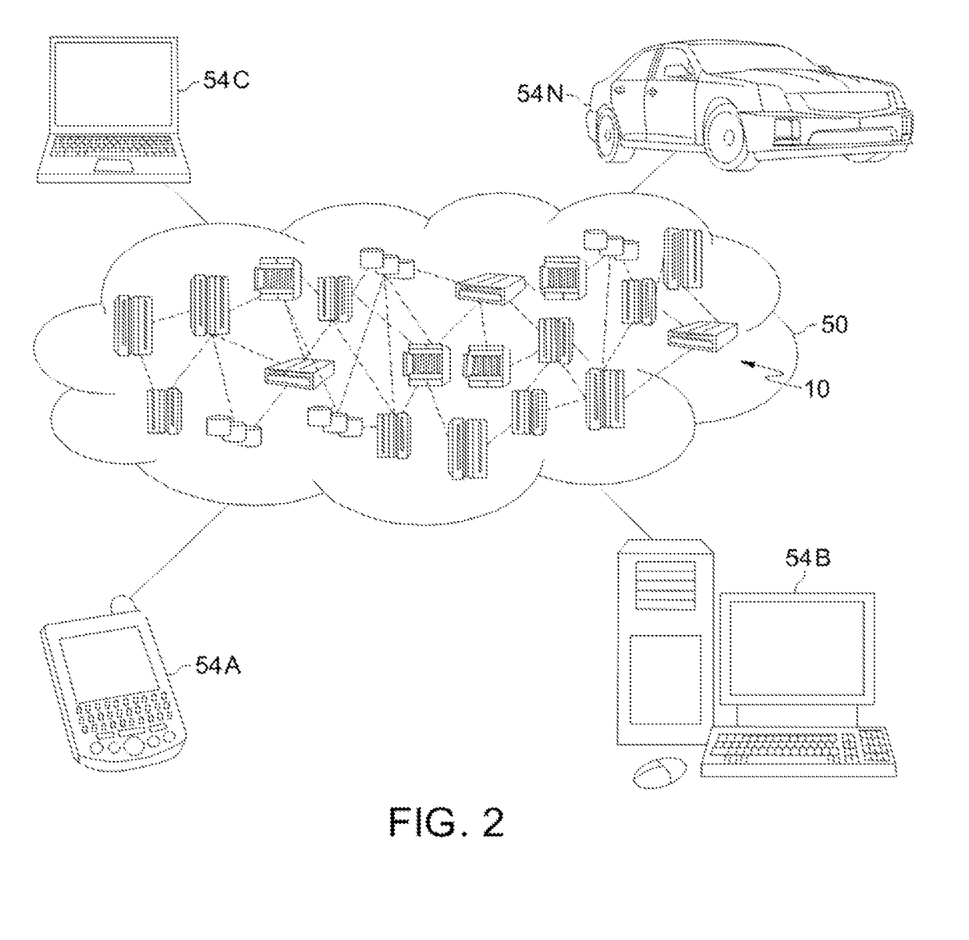
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
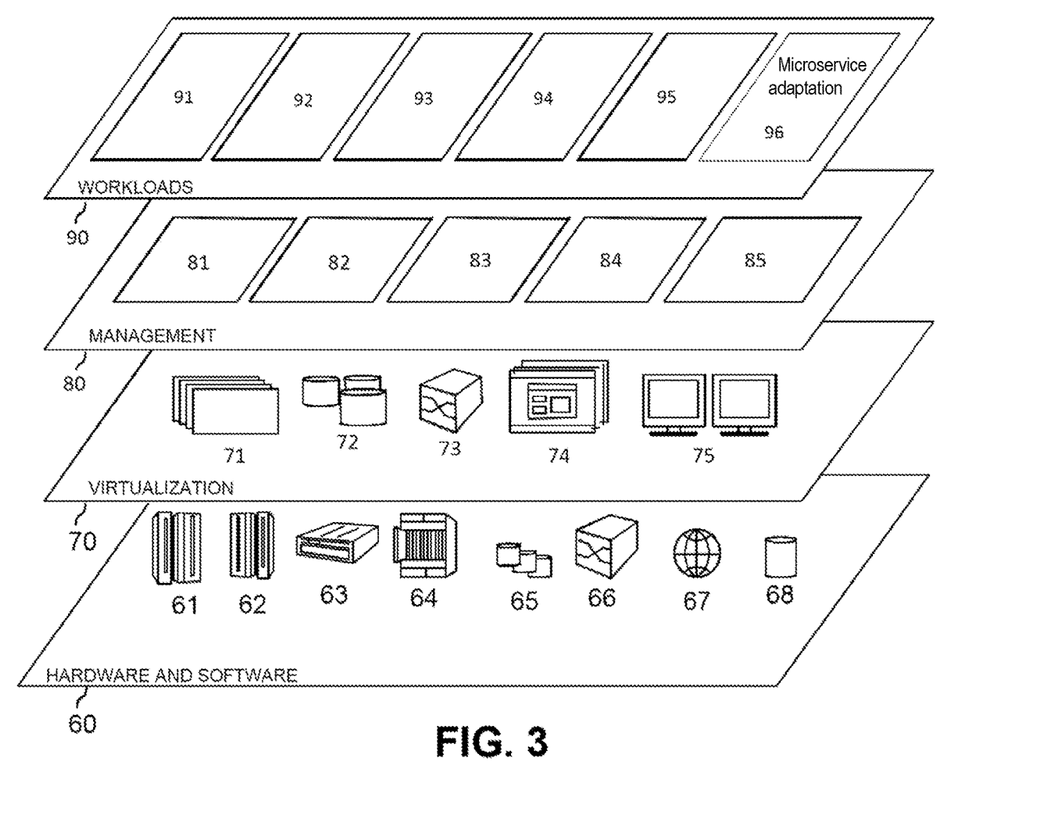
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice adaptation 96.

Implementations of the invention may include a computer system/server 12 of FIG. 1 in which one or more of the program modules 42 are configured to perform (or cause the computer system/server 12 to perform) one or more functions of the microservice adaptation 96 of FIG. 3. For example, the one or more of the program modules 42 may be configured to: receive, by a computing device, a microservice code from a user device; identify, by the computing device, a service used by the microservice code; identify, by the computing device, the service in a target cloud platform; generate, by the computing device, a modified microservice code by adding a predefined code template to the microservice code, the predefined code template being associated with the service in a target cloud platform; receive, by the computing device, user input defining a value of a parameter in the predefined code template in the modified microservice code; and generate, by the computing device, a new deployment file for the target cloud platform based on the modified microservice code.

Figure 4:
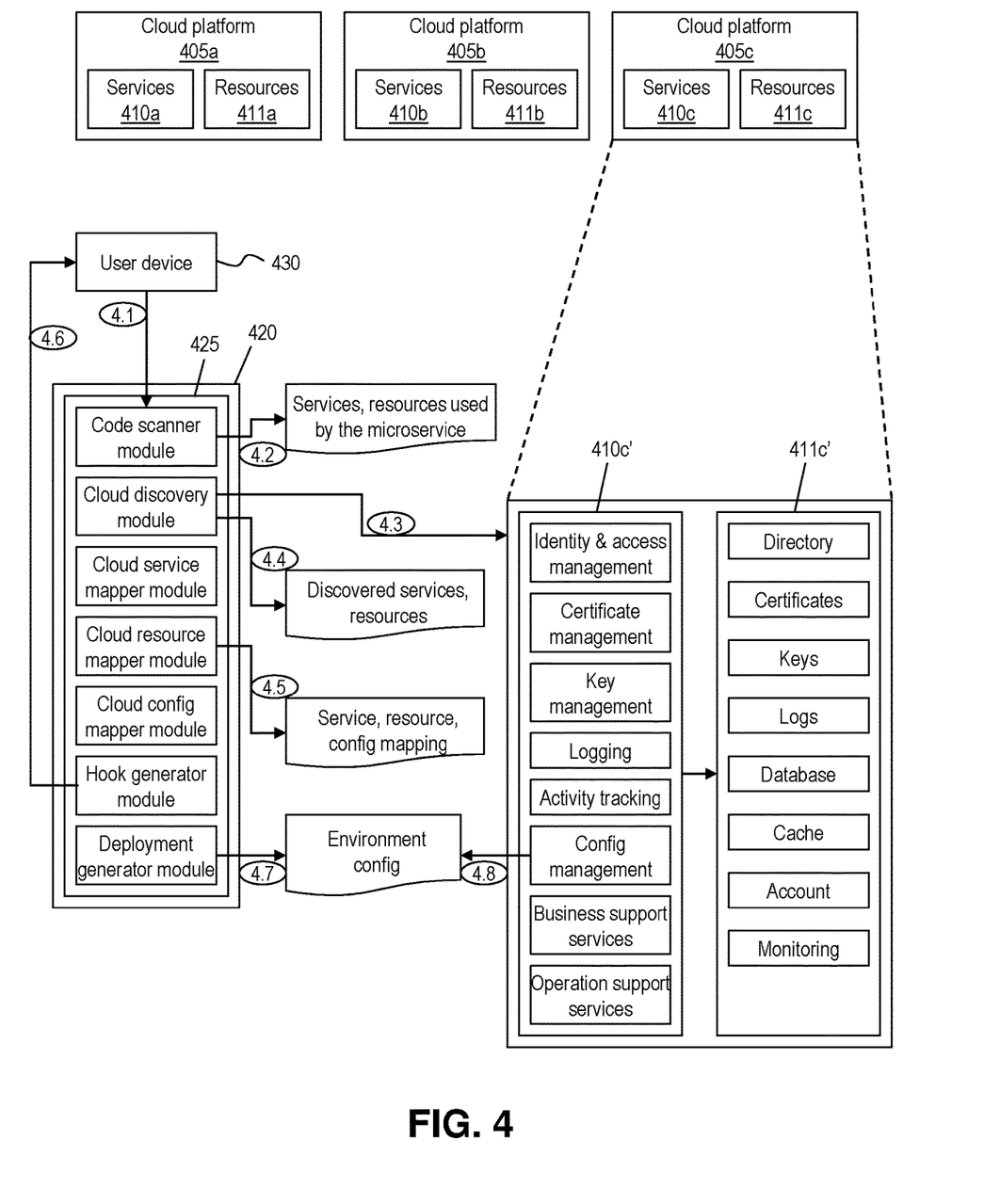
FIG. 4 shows a block diagram of an exemplary environment in accordance with aspects of the invention.

FIG. 4 shows a block diagram of an exemplary environment in accordance with aspects of the invention. In embodiments, the environment includes different cloud platforms 405*a*, 405*b*, and 405*c*, each of which includes one or more cloud computing nodes 10 in the cloud computing environment 50 of FIG. 2. Each cloud platform 405*a-c* may be provided by a different cloud provider and may provide different combinations of services and resources including one or more of Software as a Service (SaaS), Platform as a Service (PaaS), and Infrastructure as a Service (IaaS). For example, cloud platform 405*a* may be provided by a first cloud provider and include services 410*a* and resources 411*a*, cloud platform 405*b* may be provided by a second cloud provider and include services 410*b* and resources 411*b*, and cloud platform 405*c* may be provided by a third cloud provider and include services 410*c* and resources 411*c*. Additional details of the cloud platform 405*c* are provided at 410*c'* (which shows examples of services 410*c*) and 411*c'* (which shows examples of resources 411*c*). Embodiments are not limited to three cloud platforms as shown, and any number of cloud platforms greater than one may be used in implementations of the invention.

In accordance with aspects of the invention, the environment of FIG. 4 includes computing device 420 that runs a Code and Deployment Readiness Optimizer (CDRO) 425. In embodiments, the computing device 420 includes one or more cloud computing nodes 10 in the cloud computing environment 50 of FIG. 2. The computing device 420 may be part of one of the cloud platforms 405*a-c* or may be separate from the cloud platforms 405*a-c*. In embodiments, the CDRO 425 comprises one or more program modules that are configured to perform functions described herein. In one example, the CDRO 425 includes a code scanner module, a cloud discovery module, a cloud service mapper module, a cloud resource mapper module, a cloud config (configuration) mapper module, a hook generator module, and a deployment generator module, each of which may comprise one or more program modules such as program modules 42 described with respect to FIG. 1. The CDRO 425 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In aspects of the invention, the environment of FIG. 4 includes a user device 430 that communicates with the CDRO 425 running on the computing device 420. In embodiments, the user device 430 includes a local computing device (such as one of devices 54A-N shown in FIG. 2) used by a cloud consumer to communicate with the computing device 420 and one or more of the cloud platforms 405*a-c*.

In accordance with aspects of the invention, the user device 430 pushes a microservice code to the CDRO 425 for the purpose of adapting the microservice code to a target cloud platform. In the example shown in FIG. 4, the target cloud platform is cloud platform 405c. In this example, the microservice code is configured to run on a source cloud platform (e.g., cloud platform 405a) and the user wishes to adapt the microservice code to run on the target cloud platform 405c. In this example, the user cannot simply deploy the microservice code to the target cloud platform and expect it to execute properly. This is because the microservice code is written with calls that are specific to one or more services 410a and/or resources 411a of the source cloud platform 405a, and these calls that are specific to the one or more services 410a and/or resources 411a of the source cloud platform 405a will not operate in the target cloud platform that has services 410c and resources 411c that are different than services 410a and resources 411a.

With continued reference to FIG. 4, steps 4.1 through 4.8 illustrate an exemplary method for adapting the microservice code to the target cloud platform 405c. At step 4.1, the CDRO 425 receives the microservice code from the user device 430. In one example, the user device 430 transmits the microservice code to the CDRO 425 as one or more files (e.g., zip files). In another example, the user device 430 transmits a link to the CDRO 425, the link defining a network location where the microservice code is stored and that is accessible by the CDRO 425 to obtain the microservice code. In embodiments, the microservice code includes source code and one or more config files.

At step 4.2, the CDRO 425 scans the microservice code to determine services and resources used by the microservice code. In embodiments, the CDRO 425 runs a comprehensive code scan on the microservice code. In embodiments, the code scan is based on predefined patterns of code usage and is utilized to identify services and resources associated with the microservice code. In one example, the CDRO 425 stores or has access to a library of predefined patterns of code usage, where each pattern is defined as corresponding to a service (e.g., identity and access, logging, key management, database, certificates, etc.). In this example, the CDRO 425 uses the code scan to look for the predefined patterns in the microservice code. When the code scan finds one of the predefined patterns in a portion of the microservice code (e.g., a group of lines of the microservice code), the CDRO 425 identifies that portion of the microservice code as being associated with the service that corresponds to the identified pattern (e.g., as defined in the library). As an illustrative example, the CDRO 425 using the code scan might determine that lines 17-21 of the microservice code are associated with an identity and access management service of the source cloud platform, and that lines 23-29 of the microservice code are associated with a key management service of the source cloud platform.

Still referring to step 4.2, in embodiments the library defines patterns of code usage and corresponding services for plural different cloud platforms and for plural different programming languages. In this manner, the code scan is configured to identify all relevant patterns of code usage in the microservice code.

Still referring to step 4.2, in embodiments the code scan operates in two modes: dev mode and ops mode. In dev mode, the CDRO 425 uses the code scan to determine compile and build time dependencies of the microservice code. In embodiments, compile and build time dependencies are those that, if not configured correctly, will prevent the microservice code from compiling and/or building and, thus, will prevent the microservice code from running. Examples of compile and build time dependencies that are determined by the code scan include, but are not limited to, plugin dependencies (e.g., Jenkins), vault services dependencies, etc. In implementations, the code scan may be configured (e.g., via appropriate programming and predefined patterns) to scan for any desired predefined compile and build time dependencies. In ops mode, the CDRO 425 uses the code scan to determine runtime failures and dependencies, as well as services required for operation performed by the code. Examples of services required for operations that are determined by the code scan include, but are not limited to, communications services (e.g., Slack, New Relic, etc.). In implementations, the code scan may be configured (e.g., via appropriate programming and predefined patterns) to scan for any desired predefined runtime failures and dependencies, and any desired predefined services required for operation.

At step 4.3, the CDRO 425 scans the target cloud platform 405c to discover services 410c' and resources 411c' supported by the target cloud platform 405. In embodiments, the CDRO 425 runs a discovery tool (e.g., the cloud discovery module) that communicates with the target cloud platform 405c and determines infrastructure, platform and software services, and resources provided by the target cloud platform 405c, as well as service locations. In embodiments, the discovery tool is programmed to use code pattern recognition, similar to the code scan used at step 4.2, to detect services and service locations of the target cloud platform 405c.

At step 4.4, the CDRO 425 documents the services and resources determined at step 4.3. In embodiments, the CDRO 425 saves data that defines the services and resources determined at step 4.3.

At step 4.5, the CDRO 425 maps the services and resources used by the microservice code (determined at step 4.2) to the services and resources supported by the target cloud (determined at step 4.3). In embodiments, the CDRO 425 runs a mapping tool (e.g., comprising the cloud service mapper module, the cloud resource mapper module, and the cloud config mapper module) that maps the resources provided by the cloud platforms to the determined services. For example, when the CDRO 425 determines that the microservice code has a portion that corresponds to access management service, the CDRO 425 generates a mapping data structure (e.g., a table) that includes resources and service locations of the target cloud platform that provide access management service. In embodiments, the mapping data structure generated by the mapping tool includes all the services identified for the microservice code (determined at step 4.2), and the mapping tool populates the mapping data structure with a corresponding resource and service location of the target cloud platform that corresponds to each respective one of the services identified for the microservice code. In some embodiments, the CDRO 425 scans plural cloud platforms at step 4.3 (e.g., the target cloud platform and additional target cloud platforms) and generates the mapping data structure for all the cloud platforms.

Figure 5:
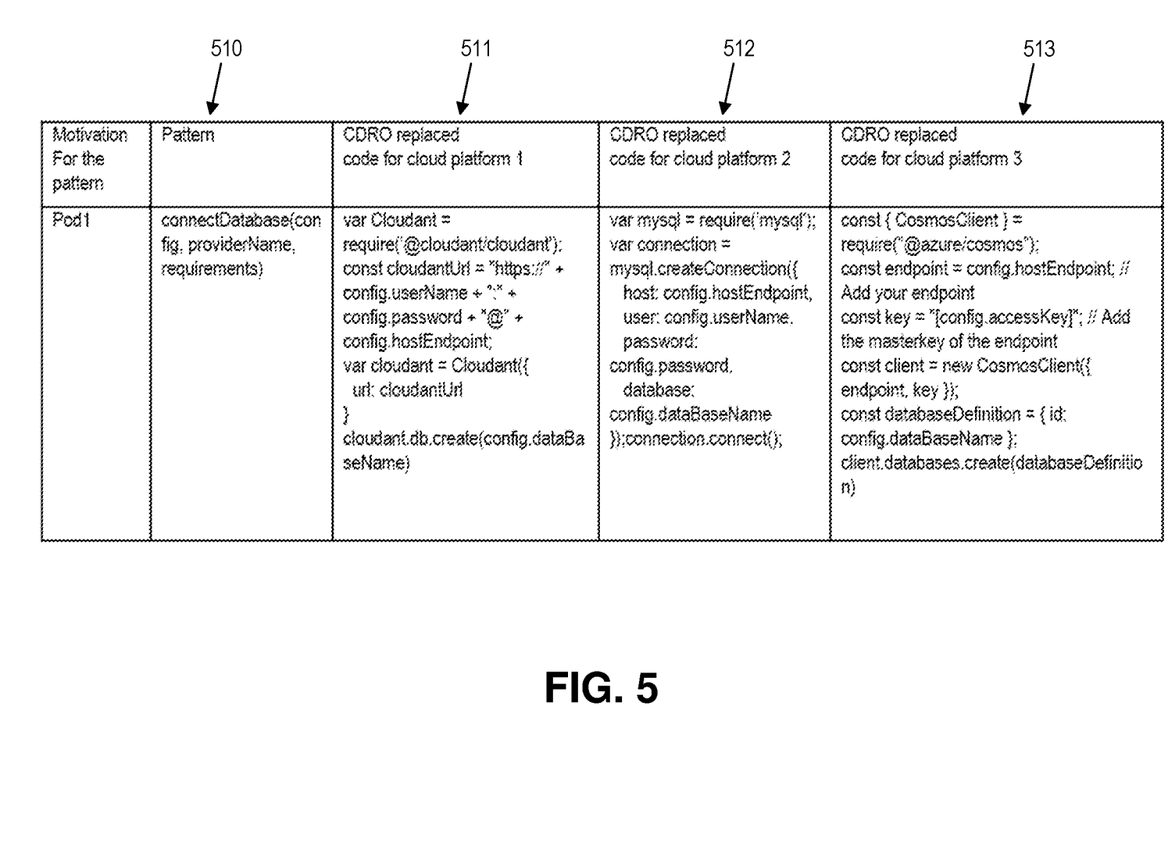
FIG. 5 shows a sample pattern identification process in accordance with aspects of the invention.

Table 1 shows an example of a mapping that is generated at step 4.5. The first column shows services identified in the microservice code (e.g., identity and access, logging, key management, database, and certificates) determined at step 4.2. The second through fourth columns show corresponding resources of different cloud platforms determined at step 4.3. For example, cloud platform 1 uses "logDNA" to provide logging services, cloud platform 3 uses "CloudWatch" to provide logging services, cloud platform 1 uses "Cloudant"

to provide database service, cloud platform 2 uses "Mongo" to provide database service, etc. The information shown in FIG. 5 is exemplary to illustrate aspects of the invention, and embodiments are not limited to this information. Also, although not shown in FIG. 5, the mapping may include additional information such as a service location of each service (e.g., a network endpoint for the "logDNA" used by cloud platform 1, etc.).

TABLE 1

| | Integrated service | | | |
|---|---|---|---|---|
| | Cloud platform 1 | Cloud platform 2 | Cloud platform 3 | Cloud platform 4 |
| Identity and access management | Cloud identity and access management (IAM) | Client LDAP | AWS IAM | Azure active directory |
| Logging | Cloud logging with logDNA | Cloud private logging | CloudWatch logs | Azure activity log |
| Key management | Key protect | Key protect or customer key management | AWS key management | Azure key and certificate management |
| Database | Cloudant | Mongo | Aurora | Cosmos |
| Certificates | Cert manager | Kubenetes cert manager | AWS cert manager | Azure key and certificate management |

As shown in Table 1, the different cloud platforms use different resources to provide a service. As such, a microservice code that is written for cloud platform 1 includes calls to the resources in the service catalog of cloud platform 1 (e.g., Cloud IAM, logDNA, Key protect, Cloudant, and Cert manager), and will not run on cloud platform 3 because the microservice code does not include calls to the resources in the service catalog of cloud platform 3 (e.g., AWS IAM, CloudWatch logs, AWS key management, Aurora, AWS cert manager).

At step 4.6, the CDRO 425 modifies the microservice code based on the mapping of step 4.5. In embodiments, the CDRO 425 stores or has access to predefined code templates for each resource in the service catalog of each cloud platform. For example, the CDRO 425 stores or has access to predefined code template for the Cloudant database of cloud platform 1, another predefined code template for the Mongo database of cloud platform 2, another predefined code template for the Aurora database of cloud platform 3, and another predefined code template for the Cosmos database of cloud platform 4. Although not all are listed here for the example shown in Table 1, the CDRO 425 stores or has access to predefined code templates for each resource shown in the second through fourth columns. In embodiments, the predefined code templates are generated by developers and stored for future use by the CDRO 425.

In embodiments each predefined code template is written specifically for its target resource (e.g., Mongo database) and may include, for example, syntax for calls to the target resource and placeholders for parameters that are used in the calls. Expression 1 is an example of a predefined code template.

$$\{\ldots \{\text{"database"}:\{\text{"requiredParams"}:[\text{"connectionString"},\text{"user"},\text{"password"}]\}\} \ldots \} \quad (1)$$

In the example shown in Expression 1, the predefined code template is for Mongo database and includes placeholders for parameters "connectionString" and "user" and "password" that are expected by the Mongo database in a call to that service. Predefined code template for other calls to other target resources have different syntax and different parameters, each depending on the target resource.

In accordance with aspects of the invention, the CDRO 425 modifies the microservice code by adding one or more of the predefined code templates. In embodiments, for each service identified in the microservice code at step 4.2, the CDRO 425 modifies a corresponding portion of the microservice code with one of the predefined code templates for the target cloud platform. For example, if the CDRO 425 determines at step 4.2 that lines 21-22 of a config template of the microservice code are directed to a call to database, and if the target cloud platform is cloud platform 2 of Table 1, then at step 4.6 the CDRO 425 updates the config template of the microservice code to include the predefined code template for database for cloud platform 2 (e.g., the predefined code template for Mongo database in this example). In embodiments, the updating the config template is performed using automated (computer-based) code injection. In one example, the updating the config template comprises the CDRO 425 deleting the original lines of the config template that correspond to the service, and adding the predefined code template in the place of the deleted lines. In this manner, for each identified service in the microservice code, the CDRO 425 modifies the microservice code to call the resource in the target cloud platform that provides the service (instead of calling the resource in the source cloud platform that provides the service). In this manner, implementations of the invention provide an automated mechanism to adapt the microservice code to run on the target cloud platform.

In embodiments, if the target cloud platform does not include a service that is identified in the microservice code, then the CDRO 425 suggests a different target cloud platform that does include that service. This may be accomplished by the CDRO 425 running a discovery on plural different cloud platforms at step 4.3 and comparing the services identified in the microservice code to the services provided by all the plural different cloud platforms. In embodiments, the CDRO 425 alerts the user when this situation arises, e.g., by sending a message to the user via the user device 430.

In some situations, the CDRO 425 may determine that a target cloud platform has plural different resources available for a single service. For example, the CDRO 425 may determine that a target cloud platform has two different resources for a key management service, the first resource being a first connection URL for a first geographic region (shown for example in Expression 2), and the second resource being a second connection URL for a first geographic region (shown for example in Expression 3).

$$\text{https://us-south.kms.cloud1.com} \quad (2)$$

$$\text{https://eu-gb.kms.cloud1.com} \quad (3)$$

In embodiments, in this situation, the CDRO 425 prompts the user to provide input to select one of the two available resources. For example, the CDRO 425 may communicate with the user device 430 to cause a user interface (UI) of the user device 430 to display the two available resources, and to prompt the user to provide input to select one of the resources. Based on receiving the user input, the CDRO 425 then modifies the microservice code with the predefined code template associated with the selected resource.

In another example that illustrates user input, the CDRO 425 determines that the microservice code has a portion of code associated with a database call. In this example, the CDRO 425 also determines that the target cloud platform supports plural different database resources, e.g., Mongo database, Redis database, and Postgres database. In this example, the CDRO 425 communicates with the user device 430 to cause the UI of the user device 430 to display the three available database resources, and to prompt the user to provide input to select one of the available database resources. Based on receiving the user input, the CDRO 425 then modifies the microservice code with the predefined code template associated with the selected resource.

In some embodiments, the predefined code template associated with a resource includes a code snippet that instructs the user how to connect to the resource in the target cloud platform. Expression 4 shows an example of such a code snippet at the term "link".

$$\{ \ldots \{\text{"database"}:\{\text{"requiredParams"}: \\ [\text{"connectionString"},\text{"user"},\text{"password"},\text{"code"}: \\ \text{"link"}]\}\} \ldots \} \quad (4)$$

In the example shown in Expression 4, the term "link" may be a link to an information source (e.g., github) that describes how to connect to this particular resource (e.g., Mongo database) in a particular runtime environment (e.g., Node.js). In embodiments, the user utilizes the description at later stages to write connection logic for this resource, e.g., when providing values for the parameters "connectionString" and "user" and "password" in this example.

With continued reference to step 4.6, in embodiments the CDRO 425 receives user input to define specific values for parameters in the predefined code templates that are inserted into the microservice code. In embodiments, the user utilizes a UI of the user device 430 to provide input and, thus, update the deployment config file(s) for the modified microservice code. For example, for the predefined code template of Expression 1, the user may provide input that defines a value for "connectionString", a value for "user" and a value for "password". In this manner, the user does not need to know the syntax for how to connect to the resource in the target cloud platform; instead, the CDRO 425 provides the syntax in the predefined code template. As noted above, the predefined code template may include a link to an information source that describes what values are expected at the parameters to connect to this particular resource in a particular runtime environment. In embodiments, the CDRO 425 hooks the supporting service configuration to the microservice deployment configuration using the user input for the parameters in the predefined code template. In this manner, step 4.6 may include the CDRO 425 preparing a list of resources required for the mapped services, preparing the configuration, and hooking the supporting service configuration to the microservice deployment configuration.

At step 4.7, the CDRO 425 generates a new deployment file for the microservice code on the target cloud platform based on the microservice code as modified at step 4.6. In embodiments, the CDRO 425 generates a Kubernetes deployment file using the modified microservice code (including any modified config files). At step 4.8, the system deploys the modified microservice code to the target cloud platform using the new deployment file from step 4.7. At this stage, the user may utilize the modified microservice code with the target cloud platform. Also, the user may continue to utilize the source (unmodified) microservice code with the source cloud platform. In this manner, the user may enjoy the benefits of a multicloud deployment for the microservice code, e.g., by utilizing the source microservice code and the modified microservice code concurrently on two different cloud platforms that have different resources for supporting the same services in the two versions of the microservice code.

In accordance with additional aspects of the invention, the CDRO 425 is configured to generate post-deployment operational hooks for the modified microservice code. In embodiments, the CDRO 425 analyzes other microservice deployments on the target cloud platform and makes a recommendation to the user based on the other microservice deployments. For example, the CDRO 425 may determine that a number of other microservice deployments on the target cloud platform use a same service in the target cloud platform (e.g., Mongo database) as does the modified microservice code. In this example, the CDRO 425 analyzes these other microservice deployments and determines that a majority of them utilize an additional service (e.g., a pager duty service) that is not included in the modified microservice code. In this example, the CDRO 425 makes a post-deployment recommendation to the user (e.g., via the UI of the user device 430) to add the additional service to the modified microservice code. In the event the user provides input to accept the post-deployment recommendation, the CDRO 425 then further modifies the modified microservice code with a predefined code template for the additional service, receives user input for parameters in the predefined code template for the additional service, and then repeats steps 4.7 and 4.8 with the further modified microservice code.

In accordance with additional aspects of the invention, the CDRO 425 is configured to prepare billing and cost information for the modified microservice code and to present this information to the user. In embodiments, the CDRO 425 analyzes cost information published for each service in the target cloud environment to determine a cost of using the modified microservice code in the target cloud platform. In embodiments, the CDRO 425 determines a cost of running the microservice code on plural different target cloud platforms (e.g., by performing a cost analysis of the respective services in the target cloud platforms) and presents this information to the user in a cost comparison of the target cloud platforms.

In accordance with additional aspects of the invention, the CDRO 425 is configured to visually present the modified microservice code to the user (e.g., via the UI of the user device 430) with the changed portions of code and new hooks highlighted for ease of reference. This allows the user to review the modified microservice code. In embodiments, the CDRO 425 performs a proactive pre-compilation and uses this to run unit test cases and end-to-end test cases if already provided as part of the microservice repository.

In accordance with additional aspects of the invention, the CDRO 425 is configured to perform preemptive optimization of availability of the microservice code in a multicloud deployment. In embodiments, the CDRO 425 analyzes availability information published for each service in the target cloud environment to determine an availability of using the modified microservice code in the target cloud platform. For example, the CDRO 425 may determine that a number of other microservice deployments on the target cloud platform use a same service in the target cloud platform (e.g., Cloud IAM) as does the modified microservice code. Based on this, the CDRO 425 analyzes the availability data of this service when used in the other microservice deployments. In embodiments, the CDRO 425 reports the determined availability to the user, e.g., via the UI of the user device 430. For example, the CDRO 425 may determine that the Cloud IAM service is available 91% of time in the other microservice deployments on the target cloud platform, and the CDRO 425 may report this number to the user. In this manner, the user may decide whether the determined availability is satisfactory for the multicloud deployment of their microservice code.

In accordance with additional aspects of the invention, the CDRO 425 is configured to perform preemptive optimization of security of the microservice code in a multicloud deployment. In embodiments, the CDRO 425 analyzes security information published for each service in the target cloud environment to determine an availability of using the modified microservice code in the target cloud platform. For example, based on the modified microservice code using Cloud IAM and Mongo database in the target cloud platform, the CDRO 425 may analyze the security of these services in the target cloud platform and present the findings to the user, e.g., via the UI of the user deice 430. In another example, the CDRO 425 may analyze the security of the modified microservice code in the target cloud platform with and without a certificate manager service and present the findings to the user. In embodiments, the CDRO 425 performs the analysis at the current platform level using published security posture data and compliance status of the services.

In accordance with another embodiment, the CDRO 425 is integrated with an integrated development environment (IDE). For example, the CDRO 425 may be a plugin in an IDE. In this embodiment, the CDRO plugin is configured to provide suggestions to the user (via a UI of the IDE) as the user is developing a microservice code, prior to the microservice code having been deployed on any cloud platform. This embodiment may be used for authoring a new microservice code, as well as transforming an existing microservice code in the manner already described herein. In this embodiment, the CDRO plugin includes a recommendation module that makes suggestions to the user based on services that are available in target cloud platforms. In this embodiment, as the user is authoring a new microservice code in the IDE, the user may write a code base and select a target cloud platform, and the CDRO plugin then modifies the code base for the selected target cloud platform in a manner similar to that already described herein, e.g., by identifying services in the code base, identifying resources that perform the same services in the target cloud platform, modifying the code base by adding predefined code templates associated with the resources in the target cloud platform, hooking the added code templates, and creating a deployment. This embodiment permits a user to identify beta and/or general availability (GA) features based on options selected by other users in other microservice codes deployed in the target platform.

Embodiments that include the CDRO functionality as part of an IDE provide a user the ability to identify code patterns in the microservice code while developing the microservice code. This can advantageously result in less code scanning since than applying the CDRO functionality to a fully developed microservice code. In one example, the IDE is configured, via the CDRO plugin, to present visual aids to the user via the UI of the IDE, the visual aids being based on the target cloud platform that the user selects. In this embodiment, the IDE is configurable, via the CDRO plugin, to perform preemptive optimization of availability and/or security of the microservice code in a multicloud deployment.

In this embodiment, the IDE is configurable, via the CDRO plugin, to perform historical analysis of similar developer actions. In one example, the CDRO plugin has connectivity with a central service of the IDE that is used by other developers. Based on this, the CDRO plugin is able to upload and analyze patterns selected by similar developers (programming language, type of code, lines of code, etc.). Based on such analysis, the CDRO plugin is able to present the most used patterns to a user in order to showcase all possible options in each domain in a target cloud platform.

In this embodiment, the IDE is configurable, via the CDRO plugin, to perform dummy pricing evaluations to fine tune the design of the microservice code. In one example, the CDRO plugin has connectivity with a central service of the IDE that is used by other developers. Based on this, the CDRO plugin is able to determine estimates of pricing involved with deploying a microservice code on a target cloud platform during the development phase of the microservice code. The pricing estimates can be visually shown as a progress bar in the IDE. In this manner, this embodiment allows a user to fine tune the design of the microservice code to match a pricing expectation (e.g., a budget).

FIG. 5 shows an example of a pattern identification process in accordance with aspects of the invention. In particular, FIG. 5 shows a pattern for a Node.js database connection. Column 510 includes data that defines a pattern that the CDRO 425 looks for in the source microservice code in step 4.2. In the example shown in FIG. 5, the pattern is that of a database connection. Columns 511-513 show three different predefined code templates for three different target cloud platforms. In this example, if the target cloud platform is cloud platform 2, then the CDRO 425 modifies the source code by adding the predefined code template shown in column 512.

Figure 6:
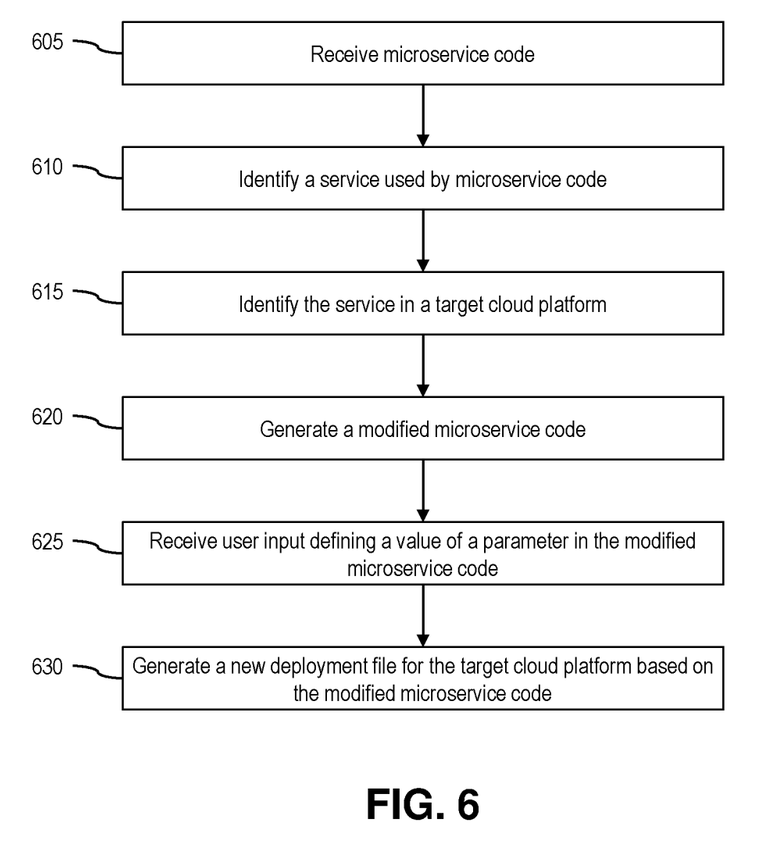
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, the system receives a microservice code. In embodiments, and as described with respect to FIG. 4, the CDRO may receive the microservice code from a user device. The microservice code may already be deployed on a source cloud platform.

At step 610, the system identifies one or more services used by the microservice code. In embodiments, and as described with respect to FIG. 4, the CDRO uses a code scan to identify services called in portions of the microservice code.

At step 615, the system identifies the services in a target cloud platform. In embodiments, and as described with respect to FIG. 4, the CDRO performs a discovery on a target cloud platform to determine whether the services from step 610 are present in the target cloud platform. Step 615 may include identifying the services in plural different target cloud platforms. Step 615 may include mapping the one or more services used by the microservice code to services that are present in the plural different target cloud platforms.

At step 620, the system generates a modified microservice code. In embodiments, and as described with respect to FIG. 4, the CDRO adds a respective predefined code template to the microservice code for each of the services identified at step 610. In embodiments, each predefined code template is different in that it is specific to the resource that supports the service in the target cloud environment. In embodiments, the CDRO adds the predefined code template using code injection.

At step 625, the system receives user input defining a value of a parameter in the modified microservice code. In embodiments, and as described with respect to FIG. 4, the predefined code templates include parameters, and the user input at step 625 provides user-specific values for these parameters.

At step 630, the system generates a new deployment file for the target cloud platform based on the modified microservice code. In embodiments, and as described with respect to FIG. 4, the CDRO generates the new deployment file. In embodiments, after step 630 the microservice code is deployed on the source cloud platform concurrently with the modified microservice code being deployed on the target cloud platform.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, a microservice code from a user device, wherein microservice code is deployed on a source cloud platform and is written with calls that are specific to services and resources in the source cloud platform;
   identifying, by the computing device, a service used by the microservice code;
   identifying, by the computing device, a corresponding service for the service in a target cloud platform, wherein the target cloud platform includes services and resources that are different than the services and resources in the source cloud platform;
   generating, by the computing device, a modified microservice code by adding a predefined code template to the microservice code, the predefined code template being associated with the corresponding service in the target cloud platform;
   receiving, by the computing device, user input defining a value of a parameter in the predefined code template in the modified microservice code;
   generating, by the computing device, a new deployment file for the target cloud platform based on the modified microservice code; and
   suggesting, by the computing device, a further modification to the modified microservice code after deploying the modified microservice code to the target cloud platform, wherein the suggesting is based on a service that other microservices use in the target cloud platform.

2. The method of claim 1, wherein the identifying the service used by the microservice code comprises performing a code scan on the microservice code.

3. The method of claim 1, wherein the generating the modified microservice code comprises adding the predefined code template to the microservice code using code injection.

4. The method of claim 1, further comprising:
   determining the target cloud platform has plural resources that provide the corresponding service;
   presenting the plural resources to a user;
   receiving input from the user selecting one of the plural resources.

5. The method of claim 4, wherein:
   each of the plural resources has a different predefined code template; and
   the predefined code template added to the microservice code is the predefined code template that is associated with the selected one of the plural resources.

6. The method of claim 1, further comprising:
   determining a cost to deploy the modified microservice code on the target platform based on the service; and
   presenting the cost to a user.

7. The method of claim 1, further comprising presenting the modified microservice code to a user with changed portions highlighted.

8. The method of claim 1, further comprising determining an expected availability of the modified microservice code on the target cloud platform based on an availability of the service in other microservices deployed on the target cloud platform.

9. The method of claim 1, further comprising determining an expected security of the modified microservice code on the target cloud platform based on security of the service in other microservices deployed on the target cloud platform.

10. The method of claim 1, wherein:
the target cloud platform is different that the source cloud platform; and
further comprising scanning the target cloud platform to discover the services and resources of the target cloud platform.

11. The method of claim 1, wherein the computing device includes software provided as a service in a cloud environment.

12. The method of claim 1, further comprising providing a multicloud deployment for the microservice code by deploying the modified microservice code on the target cloud platform using the new deployment file while the microservice code is deployed on the source cloud platform.

13. A computer program product of an integrated development environment (IDE), the computer program product comprising one or more computer readable storage media having program instructions collectively stored on the one or more computer readable storage media, the program instructions executable to:
present a user interface (UI) to a user, wherein the UI is configured to permit a user to write a microservice code that is deployed on a source cloud platform and is written with calls that are specific to services and resources in the source cloud platform;
identify a service used by the microservice code;
identify a corresponding service for the service in a target cloud platform, wherein the target cloud platform is different that the source cloud platform and the target cloud platform includes services and resources that are different than the services and resources in the source cloud platform;
discover the services and resources of the target cloud platform by scanning the target cloud platform;
generate a modified microservice code by adding a predefined code template to the microservice code, the predefined code template being associated with the corresponding service in the target cloud platform;
receive user input defining a value of a parameter in the predefined code template in the modified microservice code, wherein the predefined code template comprises a placeholder for the parameter; and
generate a new deployment file for the target cloud platform based on the modified microservice code.

14. The computer program product of claim 13, wherein the generating the modified microservice code is performed by a plugin to the IDE.

15. A system comprising:
a processor, a computer readable memory, one or more computer readable storage media, and program instructions collectively stored on the one or more computer readable storage media, the program instructions executable to:
receive a microservice code that is currently deployed on a source cloud platform;
identify services used by the microservice code;
identify the services in a target cloud platform;
generate a modified microservice code by adding predefined code templates to the microservice code, wherein respective ones of the predefined code templates are specific to respective ones of the services in the target cloud platform;
receive user input defining values of parameters included in syntax in the predefined code templates in the modified microservice code; and
generate a new deployment file for the target cloud platform based on the modified microservice code.

16. The system of claim 15, wherein microservice code is deployed on the source cloud platform concurrently with the modified microservice code being deployed on the target cloud platform.

17. The system of claim 15, wherein the identifying the services used by the microservice code comprises performing a code scan on the microservice code.

18. The system of claim 15, wherein the generating the modified microservice code comprises adding the predefined code templates to the microservice code using code injection.

19. The system of claim 15, wherein the program instructions are executable to:
determine an expected availability of the modified microservice code on the target cloud platform based on an availability of the services in other microservices deployed on the target cloud platform; and
report the determined expected availability to a user via a user interface of a user device.

20. The system of claim 15, wherein the program instructions are executable to determine an expected security of the modified microservice code on the target cloud platform based on security of the services in other microservices deployed on the target cloud platform.

* * * * *